US012404153B2

(12) United States Patent
Wiedemann et al.

(10) Patent No.: US 12,404,153 B2
(45) Date of Patent: Sep. 2, 2025

(54) DISMANTLABLE LATTICE PIECE FOR CRANE BOOM

(71) Applicant: Liebherr-Werk Ehingen GmbH, Ehingen/Donau (DE)

(72) Inventors: Ulrich Wiedemann, Ulm (DE); Roland Bohnacker, Blaubeuren (DE); Thomas Stangl, Allmendingen (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 0 days.

(21) Appl. No.: 18/660,063

(22) Filed: May 9, 2024

(65) Prior Publication Data

US 2024/0294364 A1 Sep. 5, 2024

Related U.S. Application Data

(62) Division of application No. 17/370,964, filed on Jul. 8, 2021.

(30) Foreign Application Priority Data

Jul. 10, 2020 (DE) ..................... 10 2020 118 256.2

(51) Int. Cl.
*B66C 23/70* (2006.01)

(52) U.S. Cl.
CPC .................................... *B66C 23/70* (2013.01)

(58) Field of Classification Search
CPC ...................................................... B66C 23/70
See application file for complete search history.

(56) References Cited

U.S. PATENT DOCUMENTS

| | | | |
|---|---|---|---|
| 2,975,910 A | 3/1961 | Conrad | |
| 9,738,495 B2 | 8/2017 | Bohnacker et al. | |
| 10,287,141 B2 | 5/2019 | Orlean et al. | |
| 10,287,142 B2 | 5/2019 | Roodenburg et al. | |
| 2011/0284490 A1 | 11/2011 | Liu et al. | |
| 2015/0031499 A1 | 1/2015 | Wischerath | |
| 2015/0314995 A1* | 11/2015 | Schnittker | B66C 23/28 212/347 |
| 2016/0016765 A1 | 1/2016 | Bohnacker et al. | |
| 2016/0023868 A1 | 1/2016 | Zimmer et al. | |
| 2016/0264384 A1 | 9/2016 | Roodenburg et al. | |
| 2017/0275143 A1 | 9/2017 | Orlean et al. | |

FOREIGN PATENT DOCUMENTS

| | | |
|---|---|---|
| CN | 111377367 A | 7/2020 |
| DE | 102013205173 A1 | 10/2014 |
| JP | 2016003144 A | 1/2016 |
| JP | 2017145089 A | 8/2017 |

OTHER PUBLICATIONS

Japanese Patent Office, Office Action Issued in Application No. 2021-111248, May 20, 2025, 20 pages. (Submitted with Machine Translation).

* cited by examiner

*Primary Examiner* — Anna M Momper
*Assistant Examiner* — Juan J Campos, Jr.
(74) *Attorney, Agent, or Firm* — McCoy Russell LLP

(57) ABSTRACT

The disclosure relates to a dismantlable lattice piece for a crane boom. The lattice piece comprising two corner bar sides that are each formed by at least two corner bars that are fixedly welded to one another by a plurality of connection bars and comprising a transverse connection gibbable with the corner bar plates.

3 Claims, 10 Drawing Sheets

DISMANTLABLE LATTICE PIECE FOR CRANE BOOM

CROSS REFERENCE TO RELATED APPLICATIONS

The present application is a divisional of U.S. Non-Provisional patent application Ser. No. 17/370,964, entitled "DISMANTLABLE LATTICE PIECE FOR CRANE BOOM," and filed on Jul. 8, 2021. U.S. Non-Provisional patent application Ser. No. 17/370,964 claims priority to German Patent Application No. 10 2020 118 256.2 filed on Jul. 10, 2020. The entire contents of each of the above-listed applications are hereby incorporated by reference for all purposes.

TECHNICAL FIELD

The disclosure relates to a dismantlable lattice piece for a crane boom.

BACKGROUND AND SUMMARY

Non-dismantlable parallelepiped-shaped lattice pieces that are used for lattice mast cranes generally have a width of 3 to 4 meters since these dimensions represent typical limit values for an economic transport of the lattice pieces. A larger lattice piece width is desirable, however, with respect to the achievable stiffness of the crane boom since the resulting area moment of inertia of the lattice piece due to the large width of the lattice piece increases and the deformation of the boom to the side is reduced.

Solutions are therefore being sought for large cranes to be able to use stiff lattice pieces that are as large as possible and that have width dimensions greater than the aforesaid 4 meters, but that can nevertheless be transported in an economically sensible manner. Partial solutions have already emerged that in particular propose separable lattice pieces. Such lattice pieces comprise individual bars that can be gibbed to one another for the construction of the lattice piece. Lattice pieces are also known that comprise two individual segments, with each individual segment representing a spatial support structure. These individual elements are then connected to one another via diagonal tubes. Both solution variants are, however, in need of optimization with respect to the transport and also with respect to a fast construction.

The design of cranes with parallel crane towers is also known as an alternative to the increase in size of the lattice pieces.

The object of the present disclosure comprises showing an alternative solution for a dismantlable lattice piece that has economically sensible transport dimensions, but that can be set up as quickly and in as uncomplicated manner as possible to form a large lattice piece.

It is proposed in accordance with the disclosure to assemble such a lattice piece from two lateral corner bar parts. Each lateral corner bar part, in particular a lateral corner bar plate, comprises at least two corner bars that are fixedly welded to one another by means of a plurality of connection bars and thus form an independent support structure. These individual lateral corner bar parts can be stacked onto one another for transport and can therefore be transported to the deployment site in a particularly space-saving manner. It is only necessary for the assembly of the lattice piece to put together the at least two lateral corner bar parts by means of the transverse connection expressly provided for this purpose. The transverse connection is gibbed to the two lateral corner bar parts for this purpose.

In its assembled work configuration, the lattice piece is considerably larger than the economic transport dimensions and those that are permitted in some countries. The lattice piece can, however, be simply dismantled for road transport in that the two lateral corner bar parts are separated from one another by the release of the gib connection to the transverse connection. The lateral corner bar parts are specifically rotated by 90 degrees about their longitudinal axes after the release of the gib connection so that they can be stacked onto one another. The transverse connection or its individual parts can be stored on or between the stacked lateral corner bar parts. The total lattice piece does not exceed the permitted transport widths and transport heights in the dismantled transport state. Thus, the height of the lateral corner bar parts, or the distance of the corner bars from one another, is within the transport width. The individual parts of a dismantled lattice piece may form a transport unit in the transport state.

The transverse connection, for example, comprises a plurality of diagonal bars gibbable with the lateral corner bar parts. The diagonal bars can be gibbed to the corner bars of the lateral corner bar parts at the end sides.

Additionally or also alternatively, the transverse connection can also have at least two planar lattice plates gibbed to the lateral corner bar parts in a perpendicular manner. These lattice plates form side surfaces of the assembled lattice pieces. Each of these lattice plates can be gibbed to the end regions of the lateral corner bar parts. The lattice plates can either be removed or folded onto the lateral corner bar part for transport due to the gibbing. The outer contour of the lattice piece is consequently formed by both lateral corner bar parts and both lattice plates. Each of these lattice plates can, for example, comprise two parallel longitudinal beams that are connected, in particular fixedly welded, to one another via diagonal bars and/or posts.

The lateral corner bar parts themselves can be configured with at least one connection console. Such a connection console serves the mutual fixing of individual lateral corner bar parts stacked onto one another during transport. Such a connection console can be arranged at a corner bar of the lateral corner bar parts, in particular welded in a manner projecting perpendicularly. At least two connection consoles can be provided per lateral corner bar part or per corner bar. The connection consoles can be configured as so-called twistlock consoles that are already known from the container sector.

In accordance with a further embodiment of the disclosure, the at least two lateral corner bar parts can also be configured as spatial lateral corner bar parts. The spatial extent is achieved by a respective four corner bars that are connected to one another by means of suitable connection beams, in particular posts and/or diagonals, to form a spatial parallelepiped-shaped construction. The lateral corner bar parts are accordingly themselves designed as narrow, conventionally set up lattice pieces. The corner bars are here fixedly welded to one another by means of the connection beams. Directly adjacent corner bars, or corner bars disposed in a common plane, can be fixedly welded to one another by connection beams, or diagonal beams and/or posts.

The two spatial lateral corner bar parts can be gibbed or gibbable to one another by an x-shaped transverse connection. The x-shaped transverse connection can be formed by a pair of interesting diagonal beams in accordance with an embodiment, with the diagonal beams being connected to one another at the point of intersection. They may intersect centrally at approximately half the distance between the connected lateral corner bar parts. Such an x-shaped transverse connection serves the increase of the torsion resistance of the lattice piece. The torsion resistance with respect to two individual unconnected lateral corner bar parts is considerably increased by the diagonal connections of the x-shaped transverse connection. The diagonals of the x-shaped transverse connection here prevent the twisting and displacement of the two lateral corner bar parts toward one another (the diagonals take up tension and compression here.

It is likewise conceivable that a plurality of such pairs of intersecting diagonal bars are used for the x-shaped transverse connection. These pairs can be disposed in parallel with one another between the lateral corner bar parts to be connected. Adjacent pairs of intersecting diagonal bars can be fixedly welded to one another via one or more bars. The diagonal connections can here be designed as planar framework. The kink length of an individual narrow lateral corner bar part corresponds to the total lattice piece length. Embodiments of the lateral corner bar part is rigid in compression over the complete lattice piece length due to the framework designed as a conventional lattice piece.

In accordance with an embodiment, the intersecting diagonal bars are pivotable with respect to one another about at least one pivot axis at the point of intersection. The at least one pivot axis is in particular transverse to the longitudinal direction of the diagonal bars. It is possible due to the pivot axis to fold the x-shaped transverse connection for the transport path in a space saving manner, in particular such that the diagonal bars are disposed almost in parallel with one another, or contact one another.

In addition to this x-shaped transverse connection, the two spatial lateral corner bar parts can be connected to one another by means of one or more lattice plates. The lattice plates can be gibbed to the lateral corner bar parts at the end sides. The lattice plates can here, as already stated above, also be assembled from two parallel longitudinal beams that are fixedly welded to one another by means of diagonal bars and/or posts. The lattice plates gibbed to the end regions of the lateral corner bar parts form the outer contour of the resulting lattice piece together with the lateral corner bar parts. The ends of the x-shaped transverse connection can be connected, or gibbed, to the end regions of the lattice plates or of the corner bar plates.

The lattice plates can be pivotably gibbed to at least one lateral corner bar part. The lattice plates can thereby also be folded onto the corresponding lateral corner bar parts in a space saving manner for transport purposes.

A further aspect of the disclosure that applies both to the design of the lateral corner bar parts as spatial lateral corner bar parts and to the design as non-spatial lateral corner bar parts is that the working height of a lattice piece substantially corresponds to the transport width of a transport unit formed from the individual parts of the lattice piece. A plurality of dismantled individual parts such as the lateral corner parts, transverse connections, and/or lattice plates are stacked onto one another or are folded onto one another in a space-saving manner to form a transport unit. A transport unit may comprise all the individual parts of the dismantled lattice piece. The lateral corner bar parts are rotated by 90° about the longitudinal axis of a corner bar with respect to the assembly/disassembly orientation to form the transport unit. This has the effect that the height of the assembled lattice piece corresponds to the transport width of the transport unit in operation. For the installation procedure, the lateral corner bar parts are rotated by 90° about the longitudinal axis of a corner bar out of the position in the transport unit into the required installation position.

The gibbing in the transport state may take place at the aforesaid connection consoles or twistlock consoles. This allows an inexpensive connection of the lateral corner bar parts and of the center latticing 40. Said consoles can also be used to stack a plurality of lattice pieces.

The present disclosure equally relates, in addition to the lattice piece, to a crane, in particular to a mobile crane, having at least one lattice piece. The crane may comprise a tower and/or a lattice boom that is assembled from a plurality of the lattice pieces. The crane is accordingly characterized by the same advantages and properties as the lattice piece; reference is made to the above statements to avoid repetition.

A method of installing a lattice piece is also disclosed. For an embodiment of the lattice piece having individual diagonal bars that connect the lateral corner bar parts to one another, a transport takes place of at least the lateral corner bar parts, or all the individual components of the lattice pieces, stacked onto one another. The installation of the lattice piece then takes place with the following method steps at the deployment site:

Erection of a lateral corner bar part from the transport position by setting up, or by rotation by 90 degrees about its longitudinal axis, and fixing the lateral corner bar part to a set up assembly frame or assembly console. In this setup position, the lateral corner bar part lies on a corner bar over the length of the corner bar on the ground or is fixed, for example gibbed, in the assembly console, in particular close to the ground.

In the following step, the second lateral corner bar part is erected in an analog manner and is connected to the assembly frame and/or to the assembly console. The two lateral corner bar parts can thus be aligned at a fixedly defined distance from one another by the assembly frame, said distance in particular being coordinated with the dimension of the lattice plates.

The assembly or the unfolding of the first lattice plate and the connection or gibbing of the lattice plate to the oppositely disposed lateral corner bar part takes place next. Since the distance of the two lateral corner bar parts was previously defined by means of the assembly frame, the at least one lattice plate and the lateral corner bar parts are immediately in the gibbed position. After the gibbing, at least one diagonal bar connecting the lateral corner bar parts are used for their stabilization.

The second lattice plate can subsequently be unfolded or assembled and gibbed with the oppositely disposed lateral corner bar part. As has already been explained above, the individual lattice plates can either be completely dismantled from the lateral corner bar parts or they remain gibbed to at least one lateral corner bar part and are instead folded onto the lateral corner bar part about the existing gib connection for transport purposes.

In accordance with an embodiment, an assembly of all the diagonal bars connecting the two lateral corner bar parts to one another can take place after the assembly of the second lattice plate. All the diagonal bars can be first inserted between the two corner bars lying on the ground or being close to the ground. The assembly of the diagonal bars for the connection of the two upwardly disposed corner bars of the individual lateral corner bar parts can then subsequently take place. After the assembly of all the diagonal bars, a metal gangway can optionally be placed onto the diagonal bars.

In an embodiment of the lattice piece with spatial lateral corner bar parts and an x-shaped transverse bracing, the assembly routine is similar with slight differences. Individual components of the lattice piece are here likewise stacked onto one another for transport purposes. In a first step, the setting up of the x-shaped transverse bracing then takes place by rotation by 90 degrees about its longitudinal axis. After the positioning of the x-shaped transverse strut connection on an assembly frame set up on the ground, the individual lattice plates gibbed to the x-shaped transverse strut connection can now be unfolded. Subsequently to this, the first and second lateral corner bar parts can be set up by 90 degrees after one another and can be gibbed to the x-shaped transverse strut connection.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Further advantages and properties of the disclosure will be explained in more detail in the following with reference to an embodiment shown in the Figures.

FIGS. 1*a*-6*d* are shown approximately to scale.

DETAILED DESCRIPTION

Figure 1A:
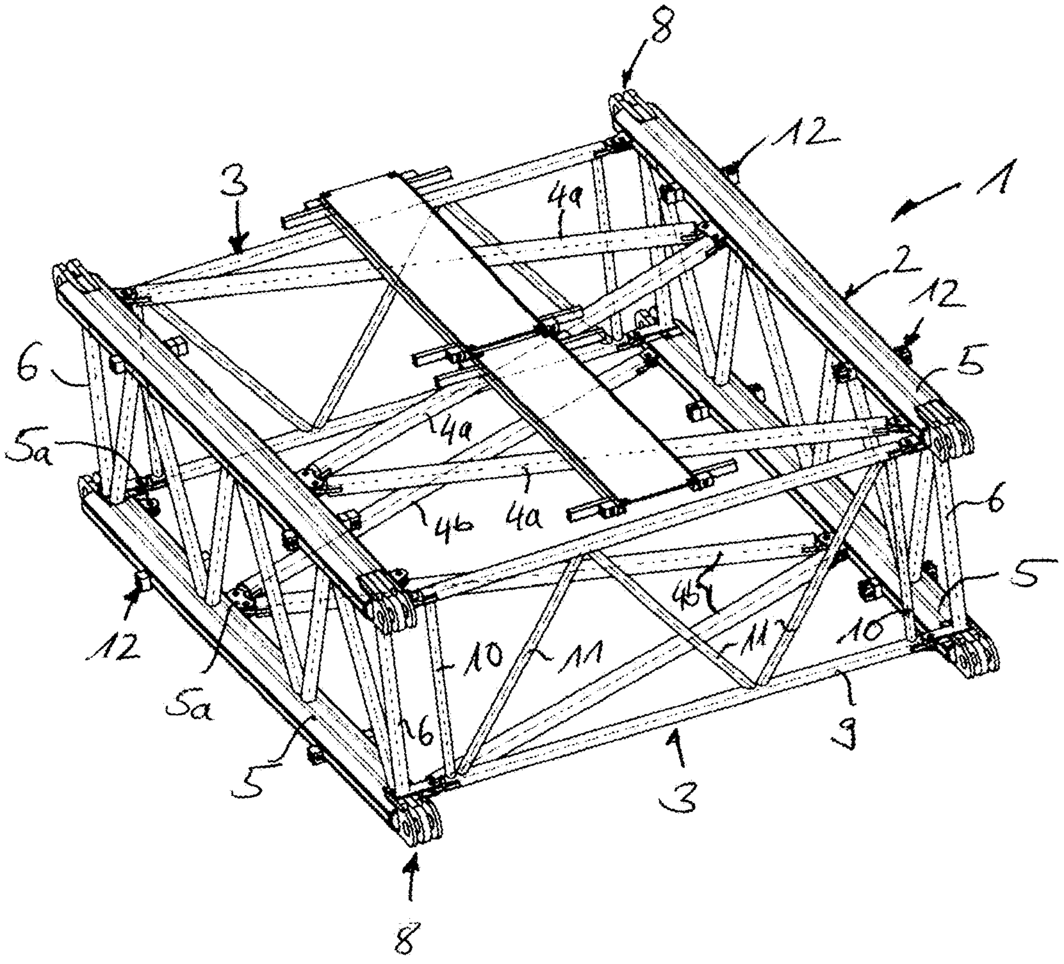
FIGS. 1*a*-1*d* depict different perspective representations of the lattice piece in accordance with a first embodiment.
Figure 1B:
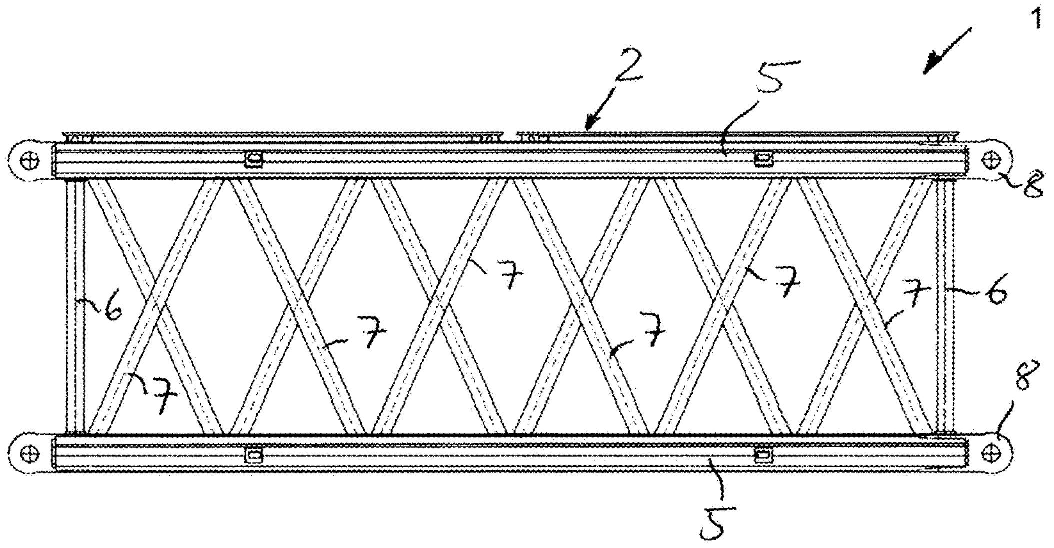
Figure 1C:
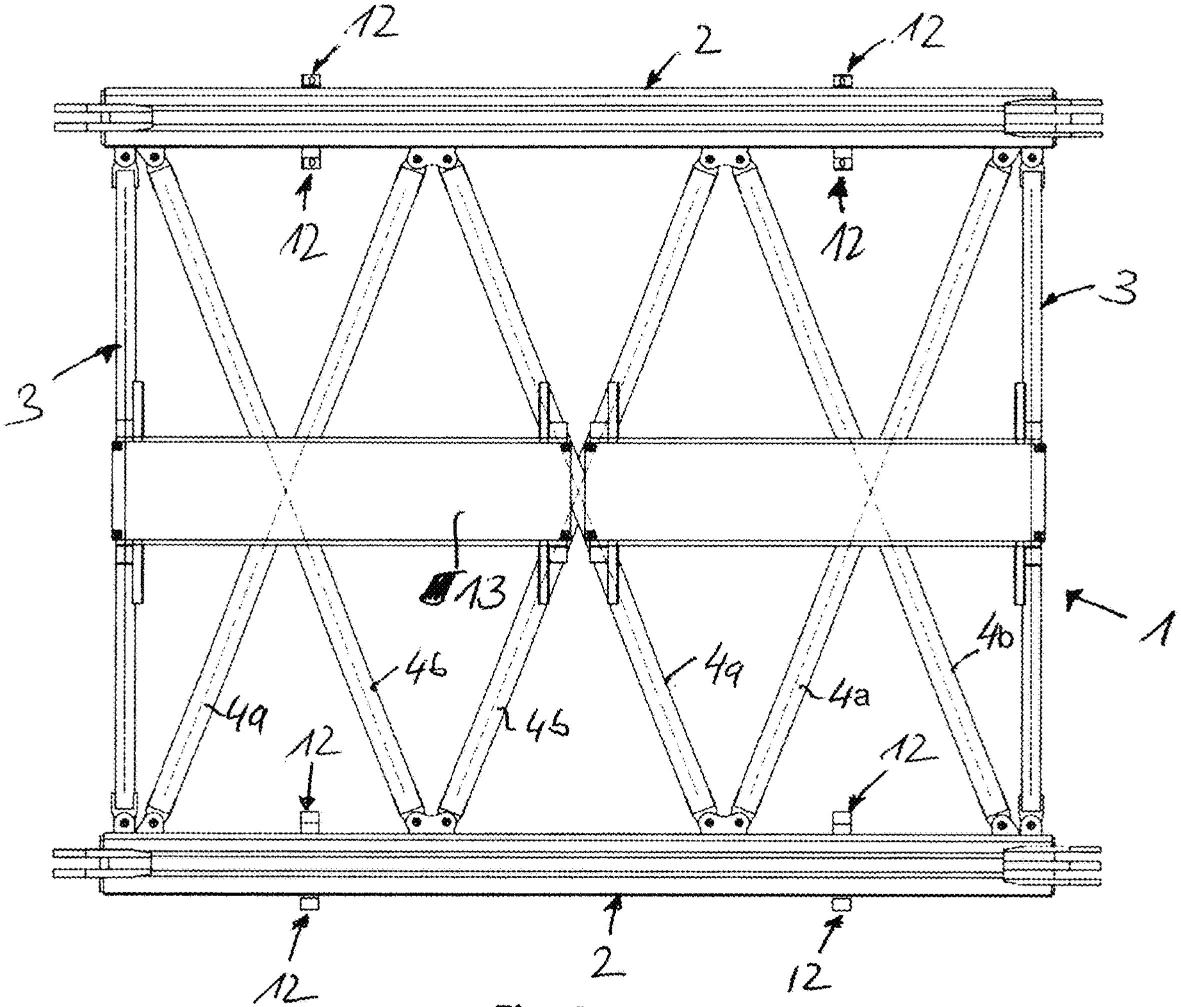
Figure 1D:
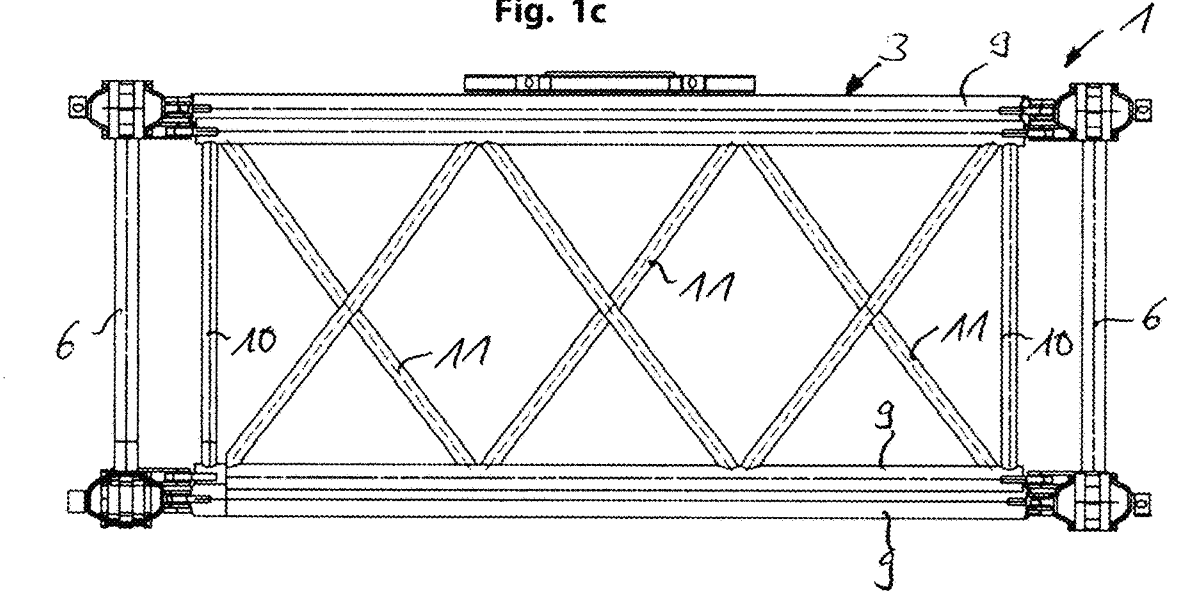

FIGS. 1 to 3 relate to a first embodiment variant of the lattice piece. Such a lattice piece 1 comprises two individual lateral corner bar parts 2 or lateral corner bar plates 2 that are connected by individual diagonals 4 and planar perpendicular lattice plates 3. FIG. 1*a* shows a perspective lateral representation of the lattice piece 1; FIG. 1*b* a side view of the lattice piece 1; FIG. 1*c* a plan view of the lattice piece 1; and FIG. 1*d* a front-side view of the lattice piece 1.

Each lateral corner bar part 2 comprises two corner bars 5 each having polygonal or oval corner bar cross-sections. The two corner bars 5 are fixedly welded to one another via a respective perpendicular post 6. The diagonal bars 7 arranged between the two posts 6 and connecting the corner bars 5 are also fixedly welded to the corner bars 5. Connection elements 8 for finger-fork connections are located at the ends of the corner bars 5 to be able to assemble the lattice pieces for setting up the crane or crane boom.

Figure 2A:
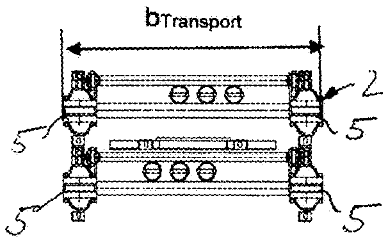
FIGS. 2*a*, 2*b*, 2*c* depict three representations of the stacked part components of the dismantled lattice piece in accordance with FIGS. 1*a*-1*d;*

The two lateral corner bar parts are connected to one another via a releasable transverse connection to form the shape of the assembled lattice piece in accordance with FIG. 1*a*. The transverse connection comprises a plurality of diagonal bars 4 and planar perpendicular lattice plates 3. In the embodiment shown, the oppositely disposed corner bars 5 of the lateral corner bar parts 2 are connected via respective diagonal bars 4*a* and 4*b*, with the diagonal bars of the corner bars 5 disposed at the top in the drawing being marked by reference numerals 4*a* and the lower diagonal bars for connecting the corner bars 5 disposed at the bottom being marked by reference numeral 4*b*. The diagonal bars are gibbed to gib mounts 5*a*. The gib mount 5*a* can, as shown, be on the corner bar 5, but alternatively also on the fork 8 or on the post 6.

The planar lattice plates 3 each comprise two longitudinal beams 9 that extend in parallel and that are fixedly welded to one another via a respective transverse bar 10 and diagonal bars 11 arranged therebetween. The ends of the longitudinal beams 9 can likewise be gibbed to matching gib mounts 5*a* of the corner bars 5. The lattice plates 3 remain gibbed to a lateral corner bar part 2 for the transport and are folded onto it around the existing gib connection.

Figure 2B:
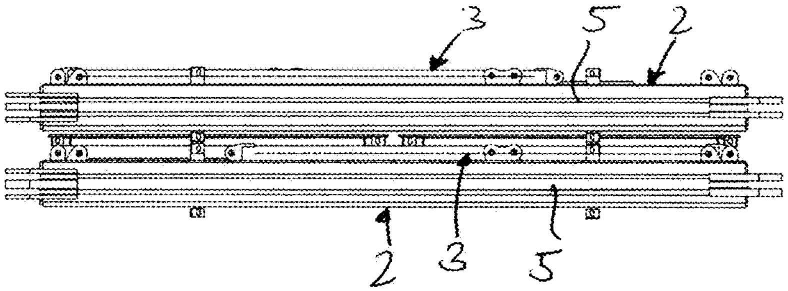

The lateral corner bar parts 2 have connection consoles 12, or twistlock consoles (so-called "container corners"), with which the lateral corner bar parts 2 can be stacked onto one another and connected to one another for an efficient transport. The connection here may take place using twistlocks that are also used for connecting ocean containers. This is shown in FIG. 2*b*.

The transport width $b_{Transport}$ of the lattice piece 2 in the transport state corresponds to the lattice height in the operating state. The components remain within the permitted transport dimensions in the transport state. This can be seen in FIG. 2*a* that shows two lateral corner bar parts 2 stacked onto one another. The distance between the two corner bars 5 of a lateral corner bar part 2 extending in parallel is marked by the transport width $b_{Transport}$ here.

In the following, the basic assembly routine for the lattice piece 1 will be described with reference to the illustrations of FIGS. 3*a* to 3*d.*

Figure 2C:
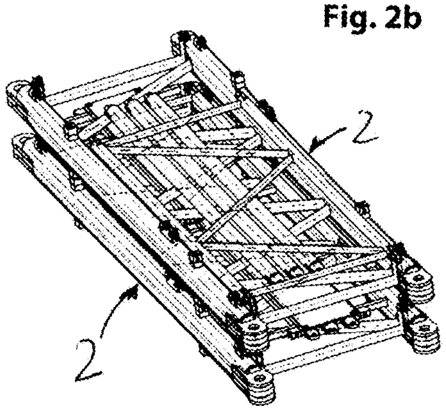

The starting point is the transport state in accordance with FIG. 2*c*; a plurality of lateral corner bar parts 2 are stacked onto one another and connected by twistlocks at the consoles 12 present at the corner bar 5 therein. The setting up of an assembly frame 20 and the connection of the assembly frame 20 to the ballast weight 21 for the stabilization of the assembly frame 20 take place first. Individual assembly consoles 2 are furthermore set up disposed opposite the assembly frame 20.

Figure 3A:
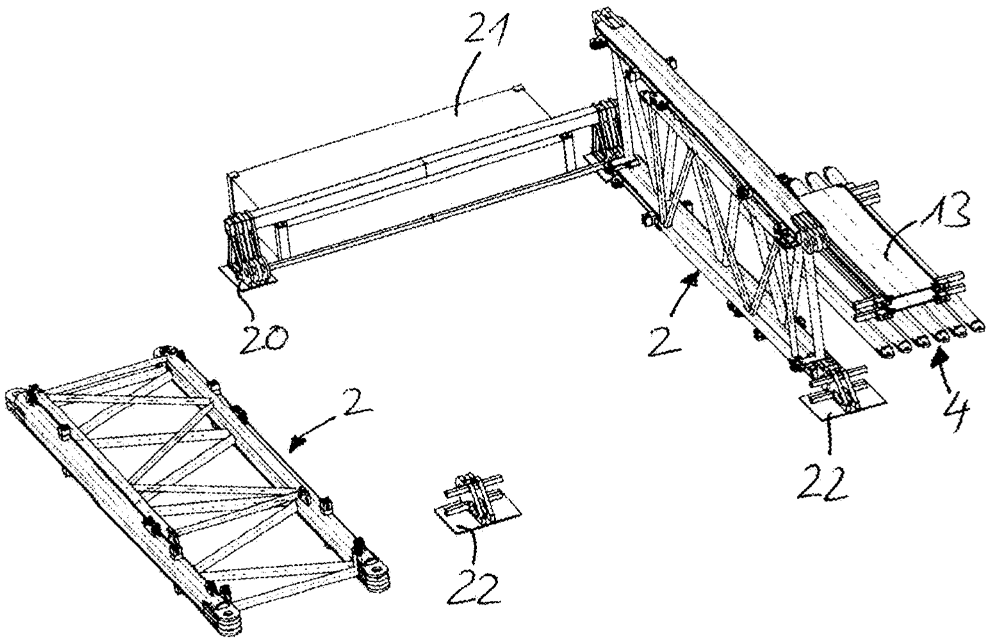
FIGS. 3*a* to 3*d* depict a chronological representation of the required assembly steps for the assembly of the lattice piece in accordance with FIGS. 1*a* to 1*d;*

A lateral corner bar part 2 is then first set up by a 90° rotation about its longitudinal axis and connected to the assembly frame 20 and to an assembly console 22 (see FIG. 3*a*). The setting up of a second lateral corner bar part 2 follows, likewise by a 90° rotation about its longitudinal axis (see FIG. 3*b*). The second lateral corner bar part 2 is also connected to the assembly frame 20 and to a further assembly console 22 and its position is thereby stabilized. The assembly frame 20 defines the distance between the lateral corner bar parts 2 here.

Figure 3B:
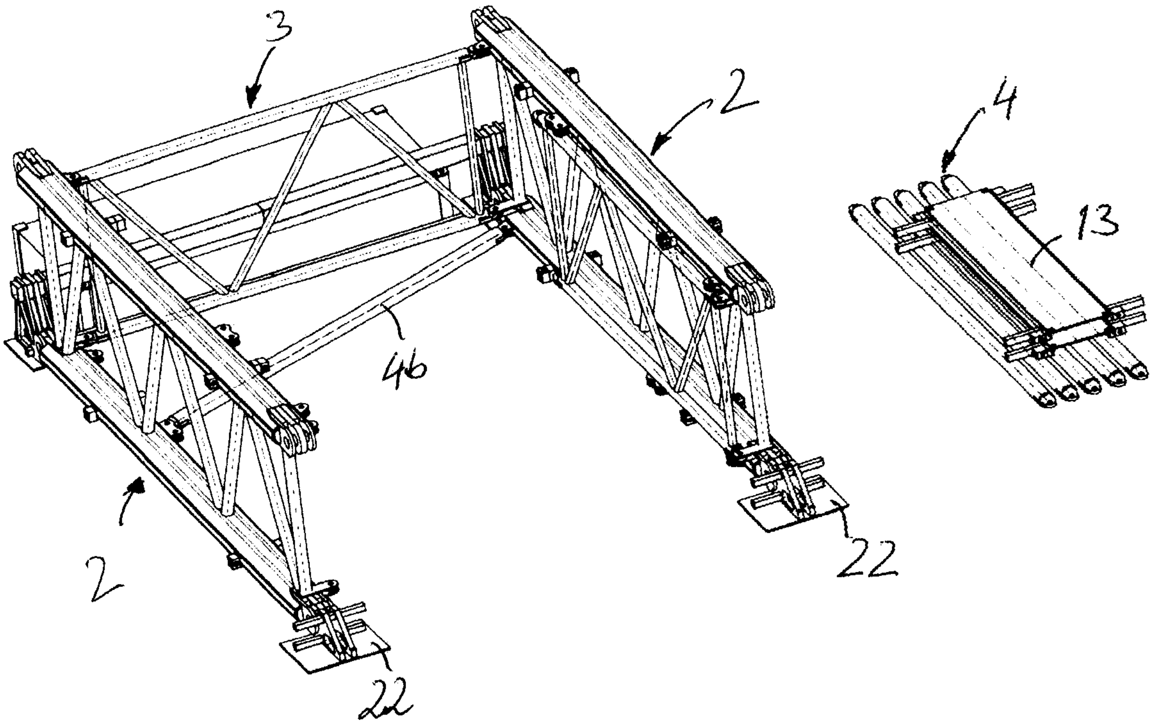

The first lattice plate 3 can subsequently be unfolded and gibbed to the second lateral corner bar part 2 (see FIG. 3*b*). At least one of the lower diagonal bars 4*b* is next inserted with the aid of an auxiliary crane and is gibbed to both side parts to achieve a stabilization of the lateral corner bar parts 2.

Figure 3C:
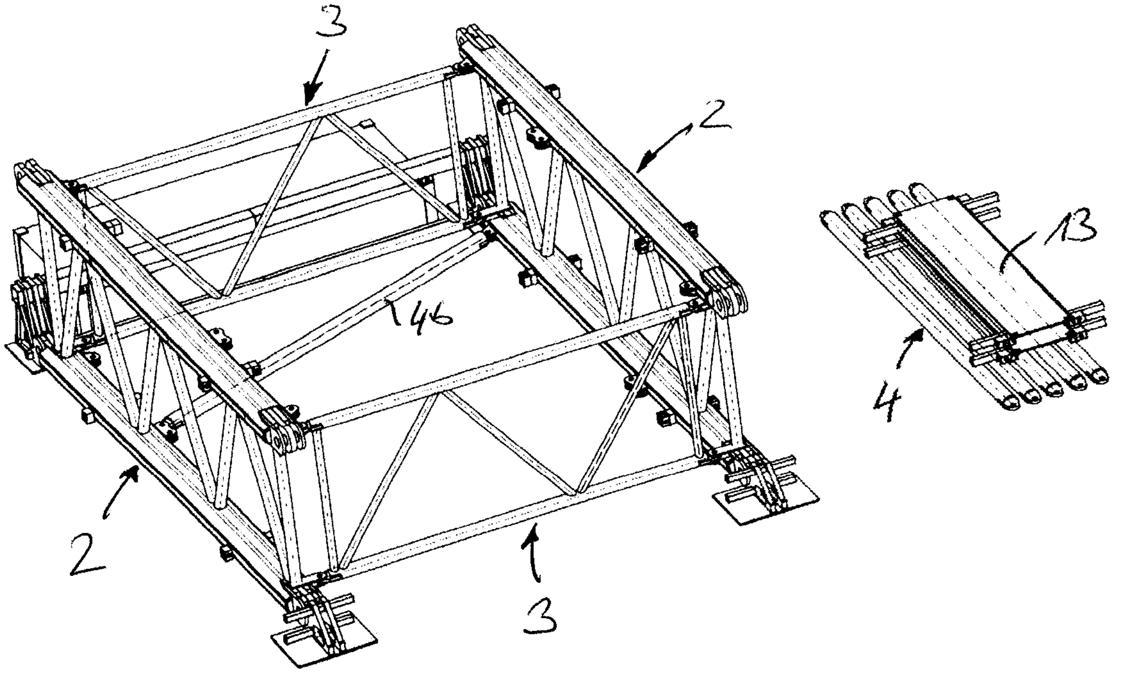
Figure 3D:
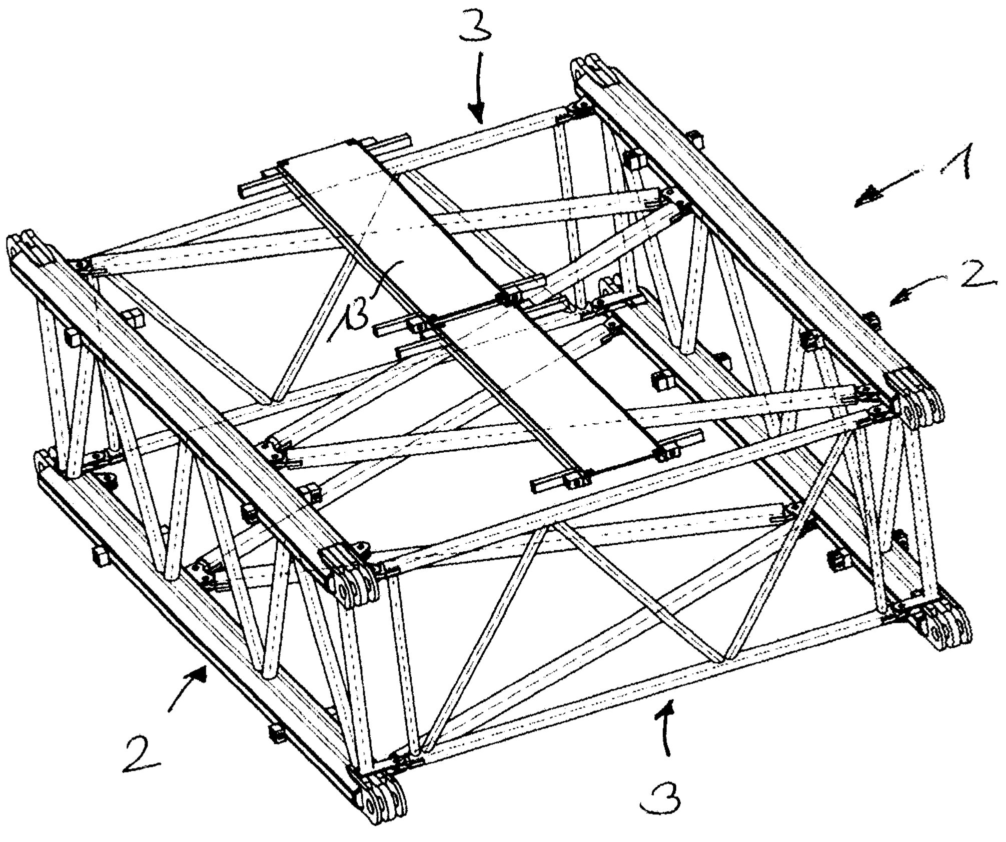

In the next step, the second lattice plate 3 is unfolded and is connected to the first lateral corner bar part 2 (see FIG. 3*c*). Then, the remaining lower diagonal bars 4*a* can first be inserted between the lateral corner bar parts 2 and then the upper diagonal bars 4*a*. Finally, the gangway 13 can be placed onto the upper diagonal bars 4*a* and the assembled lattice piece 2 can be raised out of the assembly frame 20, 22 (see FIG. 3*d*).

The described steps are carried out in reverse order for the dismantling of the lattice piece.

The properties of the lattice piece can be summarized as follows:

Dismantlable lattice piece 1 that has larger dimensions in the working configuration than in the economic (and in some countries permitted) transport dimensions in road transport.

Two foldable planar lattice plates 3 for the transverse connection of the two lateral corner bar parts 2.

Gibbable individual diagonal bars 4 between the lateral corner bar parts 2.

Components placed together and rotated by 90° for transport.

Height of the lattice piece 1 in the working configuration smaller than a permitted or economic transport width (height in operation=width in transport due to 90° rotation about the longitudinal axis)

Lattice piece 100 can be transported dismantled into individual parts or all the parts can be folded up and transported when stacked onto one another as a single transport unit.

The gibbing of the individual lateral corner bar parts 2 of a lattice piece 1 at the consoles 12 in the transport state takes place using "container corners" (twistlock consoles) and twistlocks=>inexpensive connection of the lateral corner bar parts The consoles 12 can be used for stacking a plurality of lattice pieces 1.

Figure 4A:
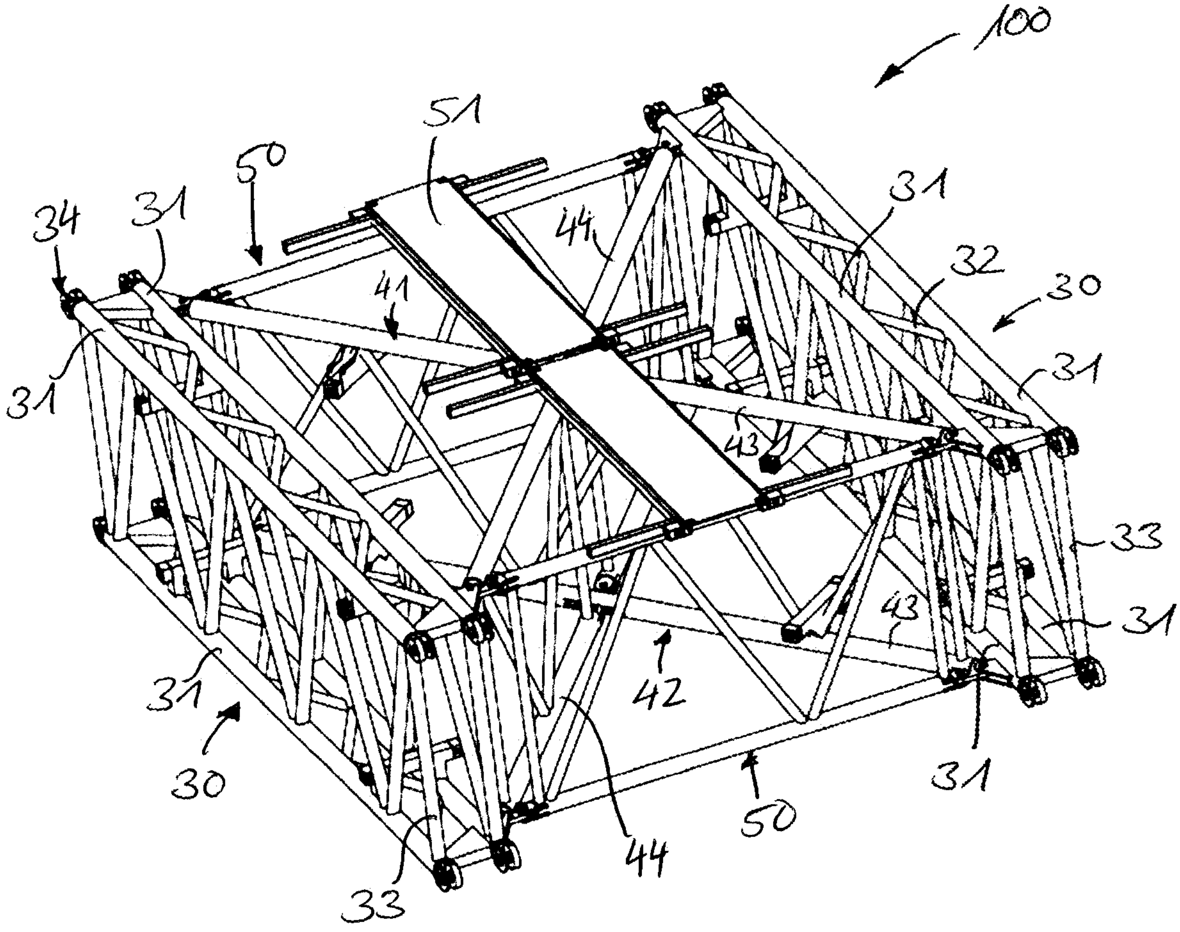
FIGS. 4*a*-4*c* depict different perspective representations of the lattice piece in accordance with the invention in accordance with a second embodiment.
Figure 4B:
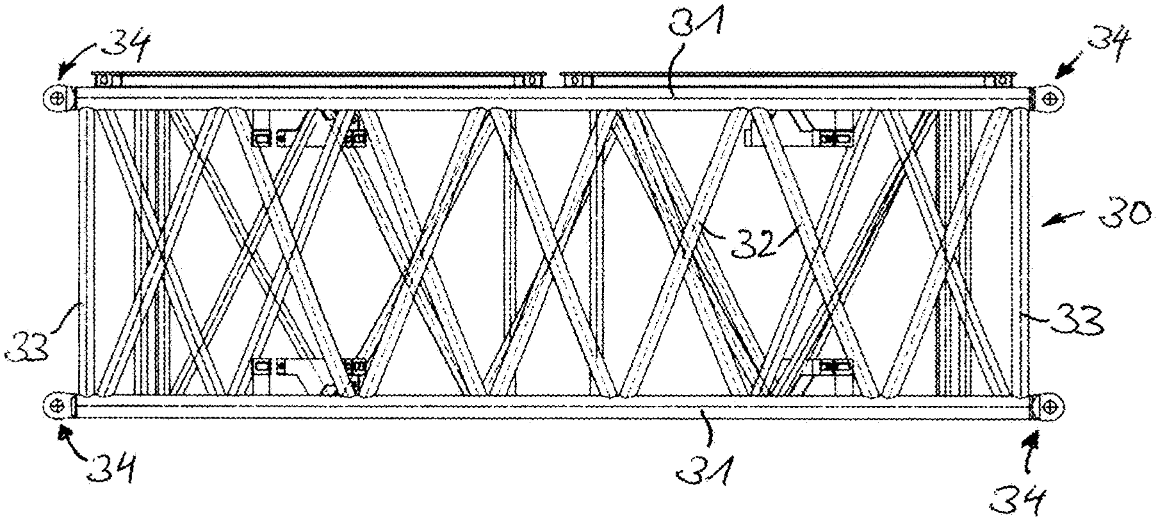
Figure 4C:
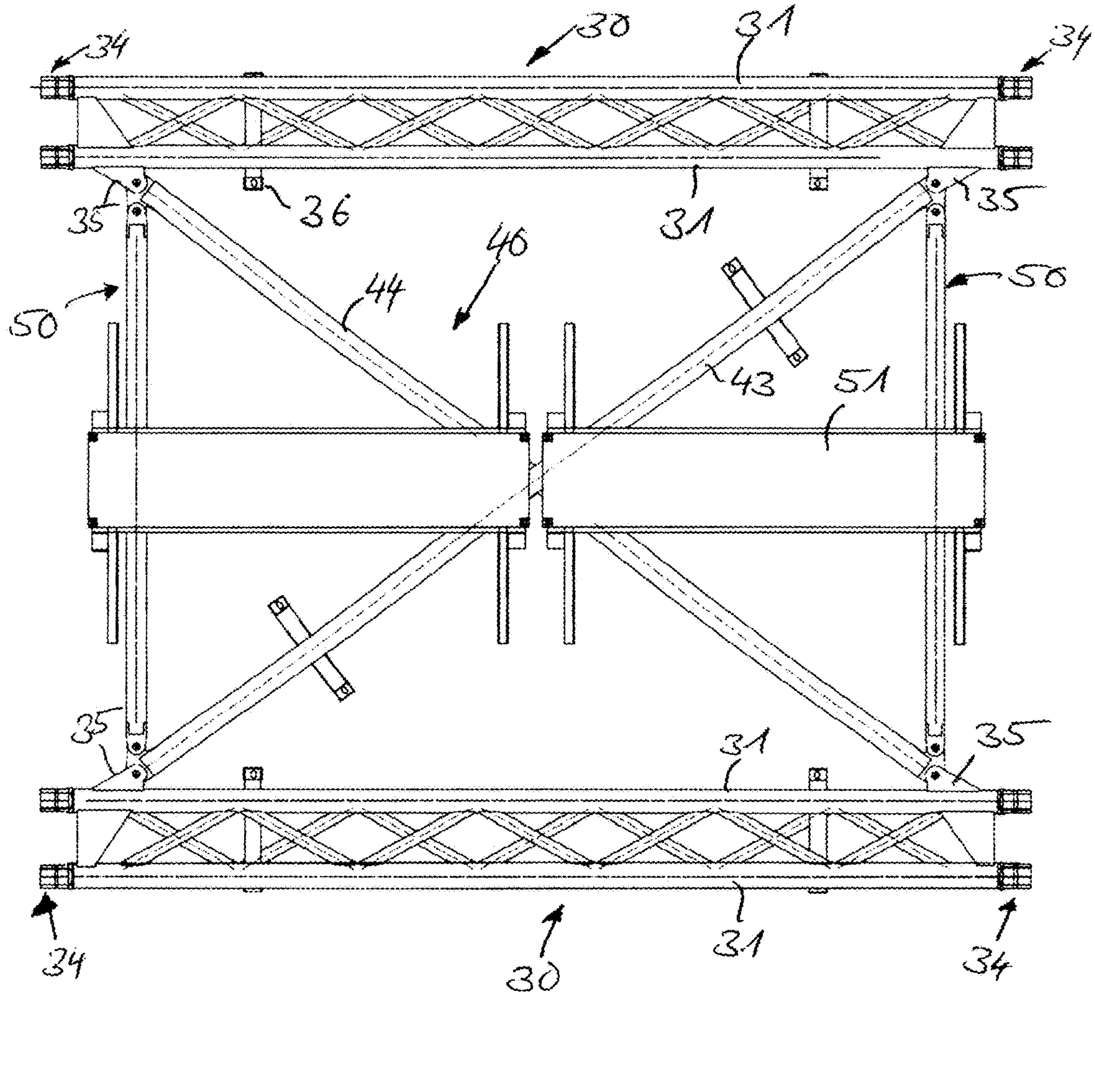

A second embodiment variant of the lattice piece is shown in FIGS. 4 to 6. Unlike the first embodiment, this variant comprises two individual spatial lateral corner bar parts 30 that are each designed as lattice pieces. The two lateral corner bar parts 30 are connected by a dismantlable x-shaped transverse connection 40. FIG. 4*a* shows a perspective lateral representation of the lattice piece 100; FIG. 4*b* a side view of the lattice piece 30; and FIG. 4*c* a top view of the lattice piece 100.

Each lateral corner bar part 30 comprises four corner bars 31, with their spatial arrangement forming a parallelepiped. Adjacent corner bars 31 are fixedly welded by means of a plurality of diagonal bars 32; the more spaced apart corner bars 31, here the upper and lower corner bars, are additionally connected at the end sides by means of perpendicular posts 33. Connection elements 34 for finger-fork connections are in turn located at the ends of the corner bars 31.

The two lateral corner bar parts 30 are connected to one another via a dismantlable or foldable x-shaped transverse connection 40 that is formed by two pairs 41, 42 of intersecting diagonal bars 43, 44. The ends of the diagonal bars 43, 44 are gibbed to the corner bars 31 via gib mounts 35 thereon Each pair 41, 42 comprises a continuous diagonal bar 43 and a diagonal bar 44 divided into two. The individual bars of the diagonal bar 44 are each connected in an articulated manner to the continuous diagonal bar 43 pivotable about axes of rotation D1, D2. Two respective ends of the diagonal bars 43, 44 are connected to one another via a planar lattice plate 50, with the lattice plate 50 being set up analogously to the lattice plate 3 of the first embodiment of the lattice piece 1. The ends of the longitudinal beams of the lattice plate 50 are pivotably connected to the diagonal bars 43, 44 and to the gib mounts 35 of the corner bars 31 so that the overall construction of the x-shaped transverse connection 40 can be folded together with the lattice plates 50 in a space-saving manner.

Figure 5A:
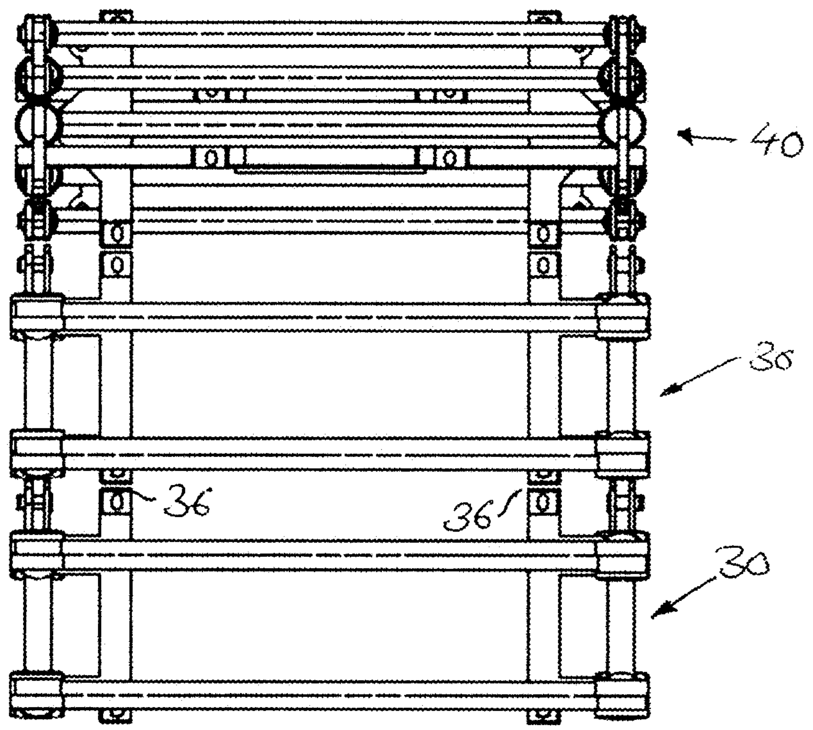
FIGS. 5*a*, 5*b* depict two representations of the stacked part components of the dismantled lattice piece in accordance with FIGS. 4*a*-4*c*.
Figure 5B:
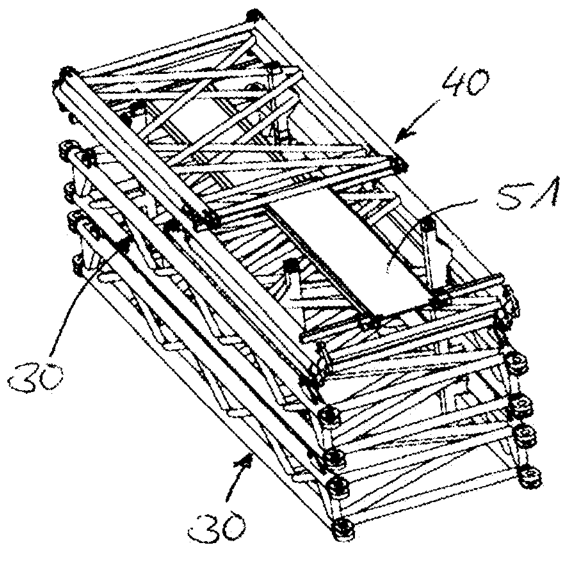

All the components of the lattice piece 100 can be stacked onto one another for transport as is shown in FIGS. 5*a*, 5*b*. The same advantages with respect to the transport width are also achieved as have already been shown with reference to the first embodiment.

The individual assembly steps for setting up the lattice piece will be explained in the following with reference to the illustrations of FIGS. 6*a* to 6*d*. In this respect, a stack of the individual parts in accordance with FIGS. 5*a*, 5*b* is assumed. The connection between the individual parts during the transport may take place here as in the first embodiment variant by means of a twistlock via the connection elements 36.

Figure 6A:
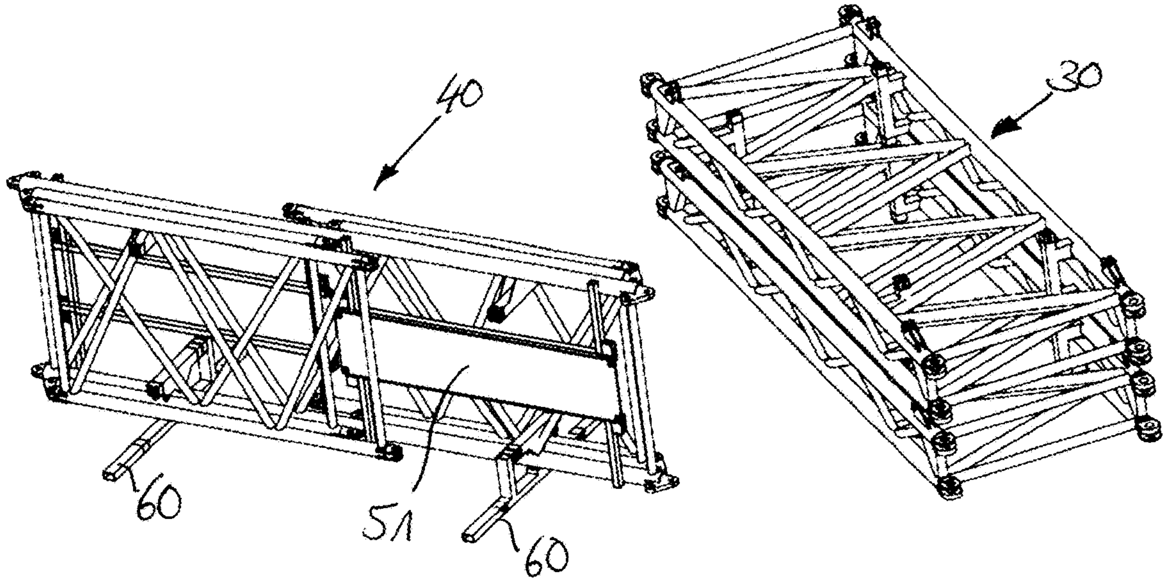
FIGS. 6*a* to 6*d* depict a chronological representation of the required assembly steps for the assembly of the lattice piece in accordance with FIGS. 4*a* to 4*c*.
Figure 6B:
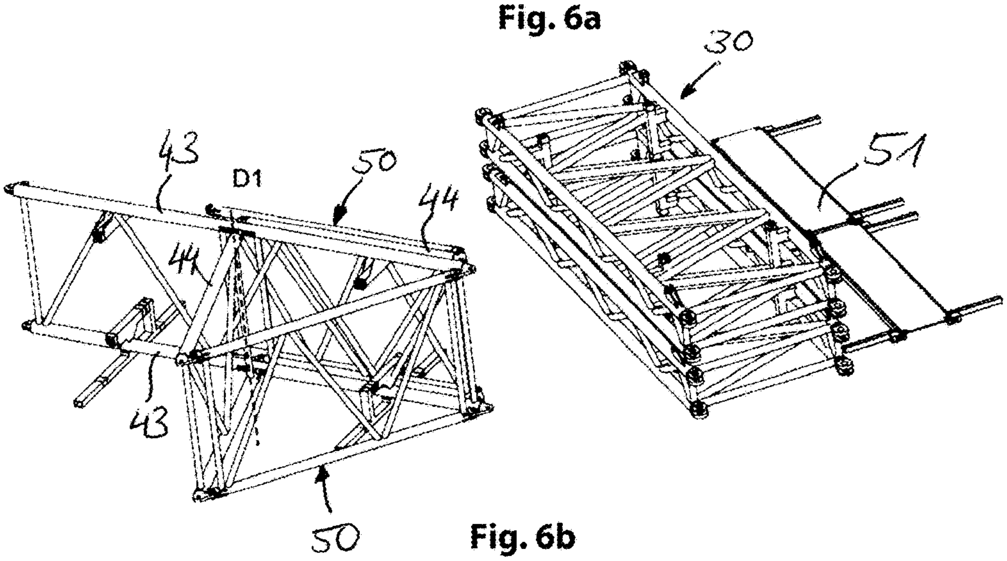
Figure 6C:
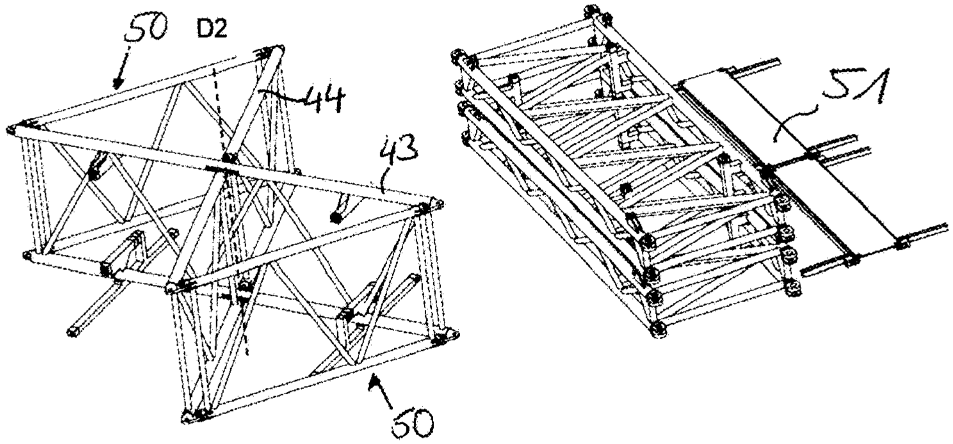
Figure 6D:
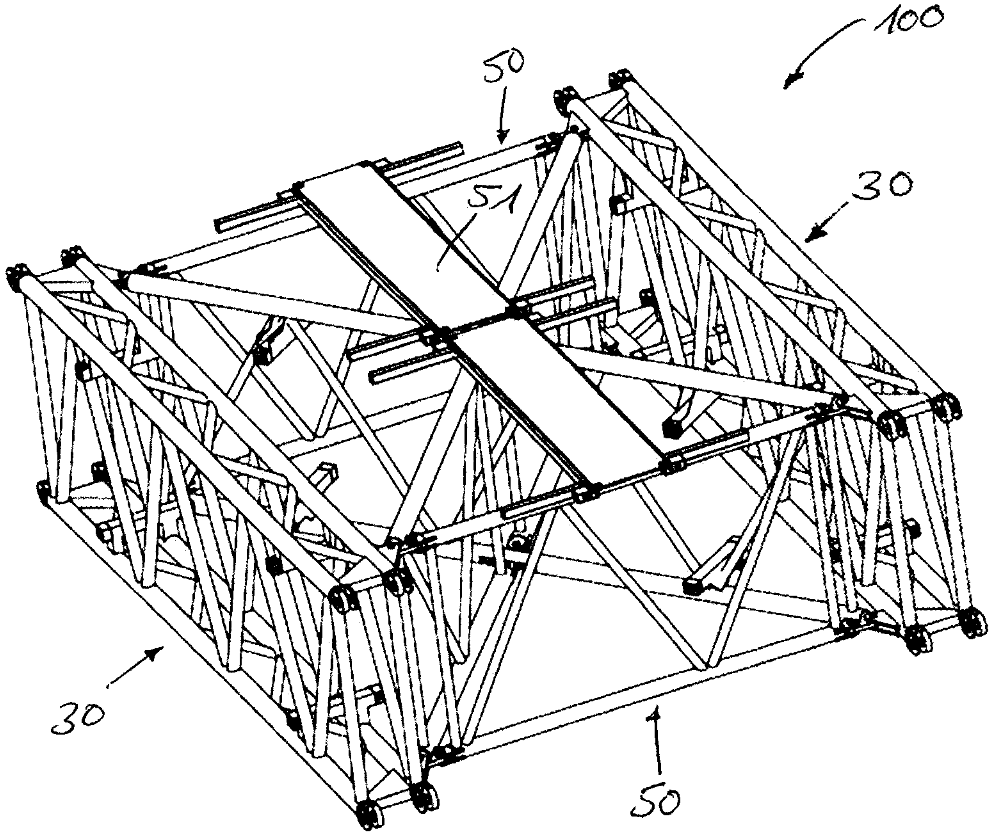

The center X-shaped latticing 40 (diagonal bars 43, 44, including the lattice plates 50) is set up in a first step for the assembly by a 90° rotation about its longitudinal axis and is fixed in an assembly frame 60 that permits a perpendicular assembly (see FIG. 6*a*). After the removal of the gangways 51 from the transport position (the gangways 51 are transported either individually or in the folded lattice piece 100), the first foldable lattice plate 50 of the center latticing 40 can be unfolded about the center axis of rotation D1 on the assembly frame 60 (see FIG. 6*b*). The second foldable lattice plate 50 of the center latticing 40 is then unfolded about the center axis of rotation D2 on the assembly frame 60 (see FIG. 6*c*).

The first lateral corner bar part 30 can subsequently be set up by a 90° rotation about its longitudinal axis and can be gibbed to the center latticing 40. This is done analogously for the second lateral corner bar part 30 (see FIG. 6*d*). The required rotation of the lateral corner bar parts about their longitudinal axes takes place by means of an auxiliary crane that can take up the parts 30 via suitably arranged attachment eyes.

Finally, the gangway 51 is placed on again and the lattice piece 100 is removed from the assembly frame 60.

The advantages of the second embodiment variant are comparable with those of the first variant, but will be listed again in the following:

Dismantlable lattice piece 100 that is larger in the working configuration than in the economic (and in some countries permitted) transport dimensions in road transport.

Two narrow lateral corner bar part 30 of conventional assembly and comprising four corner bars 31, fork-finger connections 34, and welded diagonals 32 and posts 33 similar to a P boom or a boom having two towers.

Additionally, central X-shaped latticing 40 to increase the torsion resistance of the lattice piece 100.

The torsion resistance with respect to two individual unconnected lateral corner bar parts 30 is considerably increased by the diagonal connections of the central latticing 40. The diagonals of the central latticing 40 here prevent the twisting and displacement of the two lattice piece towers toward one another (the diagonals take up tension and compression here).

Foldable X-shaped diagonal connections 40.

The X-shaped diagonal connections 40 can here be designed as planar framework.

The free distance between two x-shaped diagonals can be approximately as long as the total lattice piece due to the x-shaped latticing. The area moment of inertia about the vertical axis of the lateral corner bar part cross-section therefore has to be so large in order not to kink in operation under pressure load despite the above-described free kink length between two X-shaped diagonals.

This high area moment of inertia required here about the vertical axis of the lateral corner bar part cross-section is achieved by a spatial design of the lateral corner bar part. That is, an x-shaped checkering requires a very high area moment of inertia of the lateral disk cross-section.

Embodiments of the X-shaped center latticing as diagonal connections 40 have to be made for every lattice piece 100.

Components of the lattice piece 100 can be folded for the transport and can be rotated by 90° about the longitudinal axis.

Height of the lattice piece 100 in the working configuration smaller than a permitted transport width (height in operation=width in transport due to 90° rotation)

Lattice piece 100

1) can be transported dismantled into individual parts or 2) all the parts can be folded up and transported as a single transport unit.

The gibbing in the transport state may take place at the stack consoles 36 using "container corners" (twistlock consoles) and twistlocks=>inexpensive connection of the lateral corner bar parts 30 and the center latticing 40.

The consoles 36 can be used for stacking a plurality of lattice pieces 100.

FIGS. 1*a*-6*d* show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of assembling a lattice piece comprising the steps:

erecting a corner bar plate by 90° and fixing the corner bar plates to an assembly frame and/or to an assembly console such that it stands on the assembly frame and/or on the assembly console;

erecting a second corner bar plate about 90° such that it stands on a corner bar and connecting the corner bar plate to the assembly frame and/or to the assembly console;

assembly or unfolding of the first lattice plate and connecting the lattice plate to the oppositely disposed corner bar plate;

inserting at least one diagonal bar; and assembly or unfolding of the second lattice plate and connecting the second lattice plate to the oppositely disposed corner bar plate.

2. The method in accordance with claim 1, wherein all the further diagonal bars are inserted after the assembly of the second lattice plate, with all the bars first being inserted between the corner bars lying on the ground or being close to the ground, and metal gangway plates being installed at the diagonal bars after the insertion of the diagonal bars.

3. The lattice piece in accordance with claim 2, wherein the diagonal bars and/or posts are fixedly welded to one another.

* * * * *